(12) United States Patent
Herzinger et al.

(10) Patent No.: US 11,027,706 B2
(45) Date of Patent: Jun. 8, 2021

(54) APPARATUS AND METHOD FOR APPLYING WIPING WATER ONTO A VEHICLE WINDOW

(71) Applicant: Bayerische Motoren Werke Aktiengesellschaft, Munich (DE)

(72) Inventors: Michael Herzinger, Egenburg (DE); Christopher Zerwas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 97 days.

(21) Appl. No.: 16/193,576

(22) Filed: Nov. 16, 2018

(65) Prior Publication Data

US 2019/0084528 A1   Mar. 21, 2019

Related U.S. Application Data

(63) Continuation of application No. PCT/EP2017/060660, filed on May 4, 2017.

(30) Foreign Application Priority Data

May 17, 2016 (DE) ..................... 10 2016 208 446.1

(51) Int. Cl.
*B60S 1/48* (2006.01)
*B60S 1/52* (2006.01)

(52) U.S. Cl.
CPC ............. *B60S 1/482* (2013.01); *B60S 1/485* (2013.01); *B60S 1/522* (2013.01); *B60S 1/524* (2013.01)

(58) Field of Classification Search
CPC ...... B60S 1/3415; B60S 1/481; B60S 1/0844; B60S 1/482; B60S 1/485; B60S 1/522; B60S 1/524

USPC ... 15/250.04, 250.02, 250.3, 250.27, 250.14; 239/284.1; 318/DIG. 2, 444, 483, 445, 318/443

See application file for complete search history.

(56) References Cited

U.S. PATENT DOCUMENTS

| | | | | |
|---|---|---|---|---|
| 5,157,314 A * | 10/1992 | Kuhbauch | ................ | B60S 1/08 15/250.27 |
| 6,066,933 A * | 5/2000 | Ponziana | .................. | B60R 1/04 318/443 |
| 8,453,290 B2 * | 6/2013 | Amagasa | ................ | B60S 1/481 15/250.17 |

(Continued)

FOREIGN PATENT DOCUMENTS

DE  10 2005 052 844 A1  5/2007
DE  10 2006 000 215 A1  11/2007

(Continued)

OTHER PUBLICATIONS

Machine language translation of description portion of German publication 102005052844, published May 2007. (Year: 2007).*

(Continued)

*Primary Examiner* — Gary K. Graham
(74) *Attorney, Agent, or Firm* — Crowell & Moring LLP

(57) ABSTRACT

A wiper system to apply wiper fluid to a vehicle window includes at least one wiper arm, at least one sensor, and at least one control apparatus. The sensor is configured to detect, during a wiping operation, the wiper arm in at least one defined position in a wiping area of the wiper arm, and to send a detection signal to the control apparatus.

5 Claims, 4 Drawing Sheets

(56) References Cited

U.S. PATENT DOCUMENTS

| | | | | |
|---|---|---|---|---|
| 8,581,530 B2* | 11/2013 | Tisch | ........................ | B60S 1/08 |
| | | | | 318/282 |
| 9,067,567 B2 | 6/2015 | Matsumoto | | |
| 2005/0242762 A1* | 11/2005 | Assan | ................... | B60S 1/0814 |
| | | | | 318/443 |
| 2008/0196190 A1* | 8/2008 | Tisch | ........................ | B60S 1/08 |
| | | | | 15/250.17 |
| 2014/0023239 A1* | 1/2014 | Sasada | .................. | B60S 1/0844 |
| | | | | 382/104 |
| 2016/0137028 A1* | 5/2016 | Trego | ................. | B60H 1/00871 |
| | | | | 165/203 |

FOREIGN PATENT DOCUMENTS

| | | |
|---|---|---|
| DE | 10 2010 046 888 A1 | 4/2011 |
| DE | 11 2012 001 756 T5 | 2/2014 |
| EP | 3 002 169 A1 | 4/2016 |
| FR | 2 991 948 A1 | 12/2013 |
| GB | 2 326 083 A | 12/1998 |
| WO | WO 2012/089479 A1 | 7/2012 |

OTHER PUBLICATIONS

PCT/EP2017/060660, International Search Report dated Jul. 13, 2017 (Two (2) pages).

German Search Report issued in German counterpart application No. 10 2016 208 446.1 dated Jan. 20, 2017, with Statement of Relevancy (Six (6) pages).

* cited by examiner

APPARATUS AND METHOD FOR APPLYING WIPING WATER ONTO A VEHICLE WINDOW

CROSS REFERENCE TO RELATED APPLICATIONS

This application is a continuation of PCT International Application No. PCT/EP2017/060660, filed May 4, 2017, which claims priority under 35 U.S.C. § 119 from German Patent Application No. 10 2016 208 446.1, filed May 17, 2016, the entire disclosures of which are herein expressly incorporated by reference.

BACKGROUND AND SUMMARY OF THE INVENTION

The invention relates to an apparatus and a method for applying wiper fluid to a vehicle window.

In vehicles, for the most part two different types of wiper system are used. Firstly, use is made of rotary systems, which are embodied without wiper motor electronics and in particular without a position encoder. Secondly, use is made of reversing systems, which are equipped with wiper motor electronics and in particular with a position encoder.

In order to apply fluid to the vehicle window, use is usually made of one or more wiper fluid nozzles or wiper fluid nozzle chains, which are arranged preferably on or under the hood, or are embodied in a manner integrated entirely or partly into the hood. As a result of the distance between the wiper fluid nozzle(s) and the vehicle window, the spray jet is greatly exposed to aerodynamic incident flow of the vehicle. As a result of the aerodynamic incident flow, the spray jet is deflected downward, in particular at high vehicle speeds. This has the result that the application of wiper fluid changes and no longer takes place uniformly and in particular no water reaches the region of the camera for driver assistance systems (KAFAS region).

Therefore, wet-arm systems, as they are known, are increasingly being used, these reducing the aerodynamic influence. In wet-arm systems, the application of wiper fluid takes place through wiper fluid nozzles integrated into the wiper arm and/or into the wiper blade or attached to the wiper arm and/or to the wiper blade. In conjunction with wet arms, only reversing systems are used, since these have an exact position encoder.

The application of fluid to the window takes place in the known reversing systems in each case only in one direction, in order to ensure a clear view for the driver. To this end, however, it is necessary to be familiar with the precise reversal locations, or the precise position of the one or more wiper arms.

However, reversing systems have higher production costs than rotary systems. Furthermore, there is a limited pool of providers of reversing wiper systems.

DE 11 2012 001 756 T5 relates to a vehicle wiper apparatus for a vehicle which is provided with a wiping surface which has a first wiping area on a passenger side and a second wiping area on a driver's side. A first wiper serves to wipe the first wiping area and a second wiper serves to wipe the second wiping area. A washer nozzle is arranged on the first wiper in order to supply washing fluid to the wiping area.

DE 10 2010 046 888 A1 relates to an apparatus for conducting cleaning liquid to a glass surface of a motor vehicle, said glass surface comprising a first wiping zone, which is wiped by a first windshield wiper, and a second wiping zone, which is wiped by a second windshield wiper. The apparatus has at least one liquid distributor, with which the liquid can be conducted from a liquid inlet to a first liquid outlet, which is associated with the first wiping zone, and to a second liquid outlet, which is associated with the second wiping zone.

According to one aspect of the invention, a wiper system for applying wiper fluid to a vehicle window has at least one wiper arm, at least one sensor unit, and at least one control apparatus. The sensor unit is arranged and configured so as to detect the wiper arm when the latter is in wiping operation and passes a predefined position in a wiping area on the vehicle window, and to send a detection signal to the control apparatus.

In one aspect of the invention, the sensor is arranged in the middle at the upper edge of the vehicle window. This has the advantage that an existing sensor can be used for several functions. In particular, an existing multifunctional unit that is used as a rain sensor and/or light sensor can be used for the additional function of detecting a wiper arm when said wiper arm reaches a predefined position on the vehicle window during wiping operation.

In one aspect of the invention, in the upward wiping direction, the detected position is arranged before or at the reversal point from an upward wiping movement into a downward wiping movement of the at least one wiper arm.

In one embodiment of the invention, the detected position corresponds to the reversal point from the upward wiping movement into a downward wiping movement of the at least one wiper arm.

In one aspect of the invention, the sensor unit is used not only to detect the wiper arm, and the sensor unit is a rain sensor and/or a light sensor and/or a camera.

In one aspect of the invention, the control apparatus is configured in such a way that at the start of a wiping cycle, starting from a bottom starting position, at which none of the wiper fluid nozzles is active, the at least one wiper arm begins with an upward wiping movement, wherein the wiper fluid nozzles are supplied with wiper fluid, said wiper fluid nozzles ensuring fluid application in front of the wiper blade in the upward wiping direction. Furthermore, the control apparatus is configured in such a way that when or after the free end of the at least one wiper arm passes or has passed the position at which detection by the sensor unit takes place and the reversal point from the upward wiping movement into a downward wiping movement is provided, the wiper fluid nozzles are supplied with wiper fluid, said wiper fluid nozzles ensuring fluid application in front of the wiper blade in the downward wiping direction, until the at least one wiper arm has arrived in an end position which corresponds to the starting position.

In a further aspect of the invention, the wiper system has two wiper arms, wherein, during wiping operation, a first wiper arm wipes the passenger side of the vehicle window, a second wiper arm wipers the driver's side of the vehicle window, and the first wiper arm can reach the predefined position on the vehicle window.

In one aspect of the invention, the wiper system is a rotary wiper system and/or the at least one wiper arm is a wet arm.

The term wet arm encompasses a system made up of a wiper arm, wiper blade and any nozzle concept on the arm or blade. The wet arm encompasses in particular all embodiments of a wiper arm and/or wiper blade with integrated wiper fluid nozzles or wiper fluid nozzles attached to the wiper arm and/or to the wiper blade. In some embodiments, the wet arm has a combination of wiper arm, wiper blade and/or a nozzle device on the wiper arm and/or wiper blade, which, in conjunction, ensure that wiper fluid emerges at the wiper arm and/or wiper blade.

In one aspect of the invention, the at least one wiper arm has a wiper blade. Furthermore, the wiper system has at least one wiper fluid nozzle, which is configured to apply fluid in front of the wiper blade in a first direction of movement of the wiper arm. Alternatively or additionally, the wiper system has at least one second wiper fluid nozzle, which is configured to apply fluid in front of the wiper blade in a second direction of movement of the wiper arm.

In one embodiment of the invention, the at least one first and/or at least one second wiper fluid nozzle is arranged on or integrated into the wiper blade. In an alternative or supplementary embodiment of the invention, the at least one first and/or at least one second wiper fluid nozzle is arranged on or integrated into the wiper arm.

In other words, 2, 3, 4, 5, 6 or more wiper fluid nozzles can be arranged on or integrated into a wiper arm or wiper blade. The wiper fluid nozzles can be designated upward wiper fluid nozzles and as downward wiper fluid nozzles, respectively.

The vehicle window according to the invention is, in one embodiment, a window of a motor vehicle. More preferably, the vehicle window is a windshield of a motor vehicle.

In one aspect of the invention, the sensor unit has at least one of the following units: a camera, a rain sensor and/or a light sensor. The sensor unit used is preferably the camera of an existing camera for driver assistance systems (KAFAS). The sensor unit used can alternatively be an existing rain and/or light sensor.

In one aspect of the invention, the at least one sensor unit is arranged and/or configured such that the at least one sensor unit detects the wiper arm in at least one position in a wiping area of the wiper arm. In a preferred embodiment, the sensor unit is in this case positioned in a region which is located in the middle of the vehicle window and/or in the vicinity of an edge of the vehicle window, said edge being located opposite the edge at which the wiper system is attached, or at a distance therefrom in the spraying direction, such that it senses a position in the wiping area of one of the wiper arms. This region is preferably outside the direct field of view of a driver, in particular in the event that the window is a windshield of the vehicle and a clear view of a region in front of the vehicle needs to be ensured.

In a further aspect of the invention, the at least one control apparatus is configured to receive and process the detection signal from the sensor unit, and to determine the direction of movement of the wiper arm and/or the speed of movement of the wiper arm on the basis of the processed detection signal. Furthermore, the at least one control apparatus is configured to control the function of the at least one first wiper fluid nozzle and/or of the at least one second wiper fluid nozzle depending on the determined direction of movement.

According to a further aspect of the invention, a method for applying wiper fluid to a vehicle window is provided, said method comprising the following method steps of: carrying out a movement of the wiper arm/blade, detecting the wiper arm/blade in at least one defined position in a wiping area of the wiper arm/blade when the latter is in wiping operation, with at least one sensor unit, and sending a detection signal from the sensor unit to a control apparatus.

In a further aspect of the invention, in the method, the following steps are carried out in a wiping cycle: starting a movement of a wiper arm from a bottom starting position in an upward wiping direction of movement, wherein, at a starting time, no wiper fluid nozzle is active; during the upward wiping movement, supplying the wiper fluid nozzles with wiper fluid, said wiper fluid nozzles ensuring fluid application in front of the at least one wiper blade in an upward direction; detecting the at least one wiper arm by means of the sensor unit when a free end of the at least one wiper arm passes the defined position at a time at which the detection by the sensor unit takes place, wherein the defined position, with respect to the upward wiping direction, is located before or at the reversal point from the upward wiping movement into a downward wiping movement; changing the direction of movement of the wiper arm into a downward wiping direction of movement at a reversal time; during the downward wiping movement, supplying the wiper fluid nozzles with wiper fluid, said wiper fluid nozzles ensuring fluid application in front of the at least one wiper blade, until the at least one wiper arm has arrived, at one time, in an and end position which corresponds to the bottom starting position.

In one aspect of the invention, the following steps are carried out in a wiping cycle:

a) starting a movement of a wiper arm from a starting position in a first direction of movement at a starting time ($t0$);

b) detecting the wiper arm for the first time in at least one position in the wiping area of the wiper arm by means of the at least one sensor unit;

c) transmitting a first detection signal to the control apparatus;

d) changing the direction of movement of the wiper arm into a second direction of movement at a reversal time ($tu$);

e) reaching the starting position of the wiper arm at a return time ($t3$); and f) determining a time ($t1$) at which the wiper blade is detected for the first time.

In a further aspect of the invention, the further steps are carried out:

g) detecting the wiper arm for the second time, during the movement of the wiper arm in the second direction of movement, in the at least one position or in at least one other position in the wiping area by the at least one sensor unit;

h) transmitting a second detection signal to the control apparatus; and i) determining a second time ($t2$) of the second detection.

In a further aspect of the invention, the method has the steps of determining a first period ($t1+x1$) which is less than or equal to the time for which the wiper arm moves in the first direction of movement between the starting time ($t0$) and the reversal time ($tu$) and/or determining a second period ($t3-(t1+x2)$) which is less than or equal to the time for which the wiper arm moves in the second direction of movement between the reversal time ($tu$) and the return time ($t3$).

In a preferred embodiment of the invention, the reversal point is at the position of the sensor unit. In this embodiment, $x1$ is zero and $t1$ is equal to $t2$, which is equal to $tu$. In this embodiment, the second detection is optional.

In an alternative embodiment, the reversal point is not located at the position of the sensor unit and $x1$ is not equal to zero and $t1$ and $t2$ are not equal. In this embodiment, the second detection is not optional.

Further modifications which arise for operation according to the preferred embodiment compared with the alternative embodiment will be apparent to a person skilled in the art. In particular, a person skilled in the art will recognize which steps can be dispensed with in the preferred embodiment when $x1$ is equal to zero.

In one aspect of the invention, the method has the steps of: controlling at least one first wiper fluid nozzle for the first period (t1+x1) for applying fluid continuously, once or several times in front of a wiper blade of the wiper arm while the wiper arm moves in the first direction of movement, and/or controlling at least one second wiper fluid nozzle for the second period (t3−(t1+x2)) for applying fluid continuously, once or several times in front of a wiper blade of the wiper arm while the wiper arm moves in the second direction of movement.

According to the invention, the combination of a rotary wiper system with a wet-arm system and a method for controlling such an apparatus is claimed. As a replacement for the position encoder, not present in rotary systems, in the wiper system, a sensor, preferably an existing rain/light sensor, is intended to detect wiping in a region of the vehicle window and transmit this to a central control device. The signal from the sensor is used in a wiping operation during wiping as a switch-off signal or for switching over the wiper fluid nozzles.

One aspect of the invention relates to a wet-arm wiper concept having an upward washing possibility. The wiper fluid control logic in the central control device can use an RLSBS/camera pulse to define the deactivation of the upward washing movement more precisely with respect to the upper turning point and thus improve the wiping operation. Between the times t0 and the time t1+x1, application of fluid takes place in front of the wiper blade during upward wiping. At t1+x1, the wiper fluid pump switches off. The downward wiping operation takes place without fluid application. In this case, the vehicle driver has a clear view.

One aspect of the invention relates to a wet-arm wiper concept having an upward and downward washing possibility. The wiper fluid control logic on the central control device can use the RLSBS/camera pulse to deactivate the upward washing movement precisely with respect to an upper turning point and thus switch over from the use of upward wiper fluid nozzles to the use of downward wiper fluid nozzles in a temporally precise manner. In the embodiment described, the wiper fluid pump switches over, preferably through a change in a direction of rotation of the wiper fluid pump which ensures the application of wiper fluid at the wet arm. Between the times t0 and the time t1+x1, application of fluid takes place in front of the wiper blade during upward wiping. At t1+x1, the washer pump switches for example its direction of rotation and can thus control the fluid application to the other side of the wiper blade for the downward wiping operation (starting at the time t1+x2). The time t2 (RLSBS/camera pulse) can be used to check the plausibility of the washing operation. As a result, an improvement in the wiping operation can be expected.

When the apparatus according to the invention and the method according to the invention are used, basic functions of a wet-arm wiper system can thus also be provided with a rotary system. In particular the use of a local interconnect network (LIN)-bus-controlled wiper system is not necessary in order to implement a wet-arm concept.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
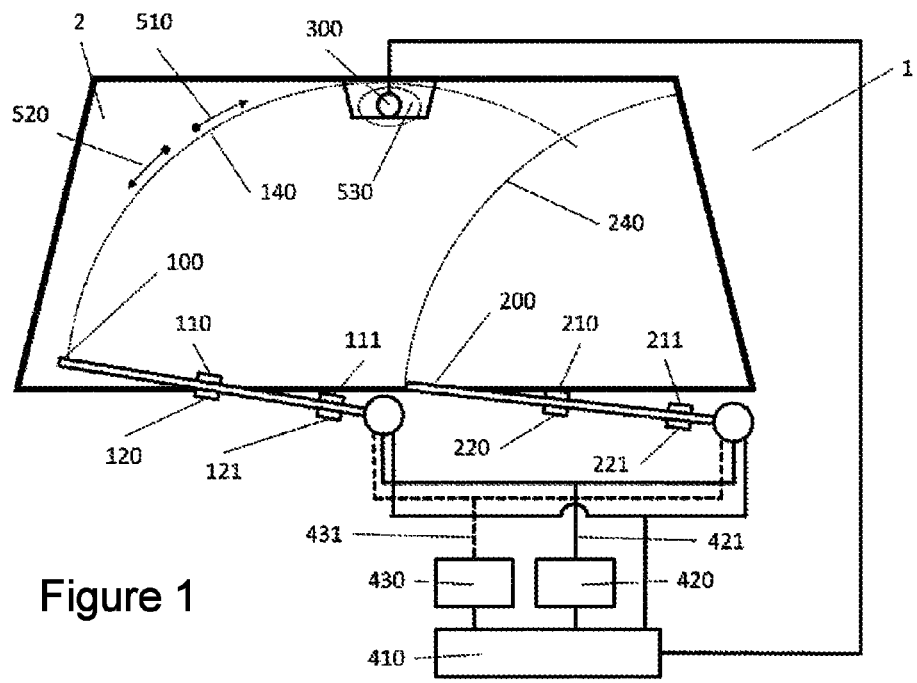
FIG. 1 shows an embodiment of the invention in a first position during wiping operation.

FIG. 1 shows an embodiment of a wiper system 1 according to the invention. The wiper system 1 is provided at a vehicle window 2. The wiper system 1 has a first wiper arm 100, a second wiper arm 200, a sensor unit 300, a control unit 410, a pump unit 420 and a motor unit 430. Arranged on the first and second wiper arms 100, 200 are at least one first wiper fluid nozzle 110, 111, 210, 211 and at least one second wiper fluid nozzle 120, 121, 220, 221. Between the sensor unit 300, the control unit 410, the pump unit 420 and the motor unit 430 there is an electrical connection 421, which is configured to transmit signals from and/or to the mutually connected components. In one embodiment of the wiper system 1, there is additionally a mechanical connection 431 with the wiper arms and the wiper fluid nozzles 110, 111, 120, 121, 210, 211, 220, 221 provided on the wiper arms. In a preferred embodiment of the wiper system 1, there is a mechanical connection 431 between the motor unit 430 and the wiper arms 100, 200.

Preferably, the mechanical connection 431 serves to transmit a movement of the motor unit 430 to the wiper arms 100, 200 and to convert the movement of the motor unit 430 into at least one movement in at least one direction of movement 510, 520 of the wiper arms.

In all of the embodiments shown below, the wiper arms have two directions of movement 510, 520. In the embodiment illustrated in FIGS. 1 to 7, the directions of movement are embodied as an upward wiping movement 510 and a downward wiping movement 520. On the window 2, the wiping area 140 of the first wiper arm 100 is illustrated. Furthermore, on the window 2, the wiping area 240 of the second wiper arm 200 is illustrated. The number of wiper arms is not limited.

FIGS. 2 to 7 show the wiper system 1 in accordance with the preferred embodiment in FIG. 1. Each of FIGS. 1 to 7 shows the wiper arms 100, 200 in a different position on the vehicle window 2 and thus also a different operating state of the wiper system 1 according to the invention. This corresponds to a different method step in the method according to the invention.

The figures, operating states and method steps are explained in more detail in the following text. Recurring features will not be described. A person skilled in the art will identify the temporal sequence and further methods and means necessary for operation of a wiper system 1 according to the invention.

FIG. 1 shows the wiper system 1 at the start of a wiping cycle according to the invention. The two wiper arms 100 and 200 are located in a starting position. None of the wiper fluid nozzles 110, 111, 120, 121, 210, 211, 220, 221 is active. At a time t0, a signal is sent to the motor unit 430 by the control apparatus and the wiping cycle is started. The wiper arms 100, 200 begin an upward wiping movement 510. With the beginning of the upward wiping movement 510, a signal is also sent to the pump unit 420 and the wiper fluid nozzles 110, 111, 210, 211 are supplied with wiper fluid, said wiper fluid nozzles 110, 111, 210, 211 ensuring fluid application 600 in front of the wiper blade on the wiper arms 100, 200 in the wiping direction 510.

Figure 2:
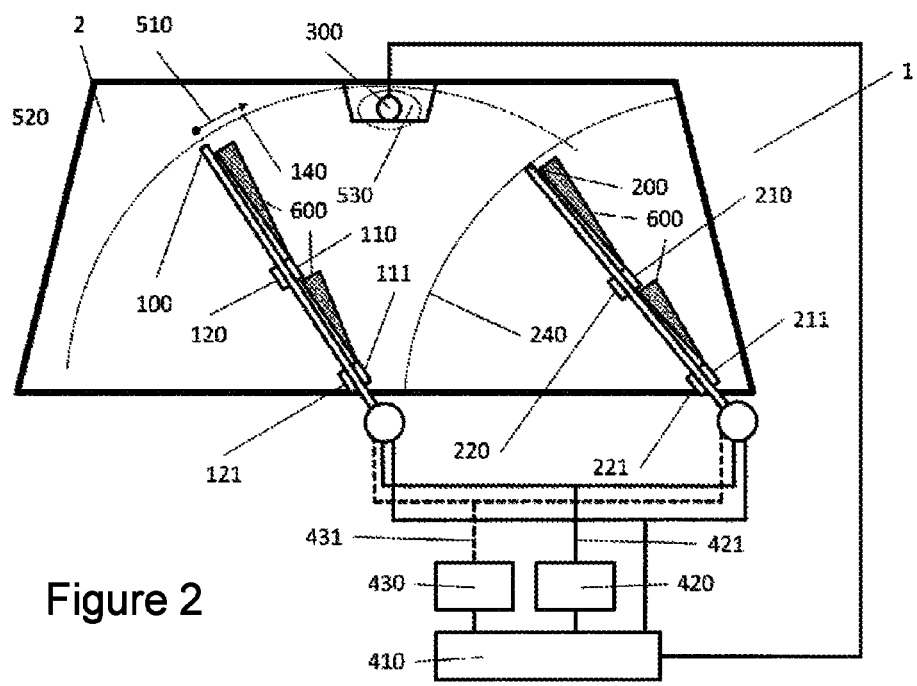
FIG. 2 shows an embodiment of the invention in a second position during wiper operation.

FIG. 2 shows the wiper system 1 from FIG. 1 during the upward wiping movement 510. Wiper fluid application 600 is taking place through the wiper fluid nozzles 110, 111, 210, 211. At the depicted time, the first wiper arm 100 is still upstream, in the direction of movement 510, of the position 530 on the vehicle window 2 at which detection by the sensor unit 300 takes place.

Figure 3:
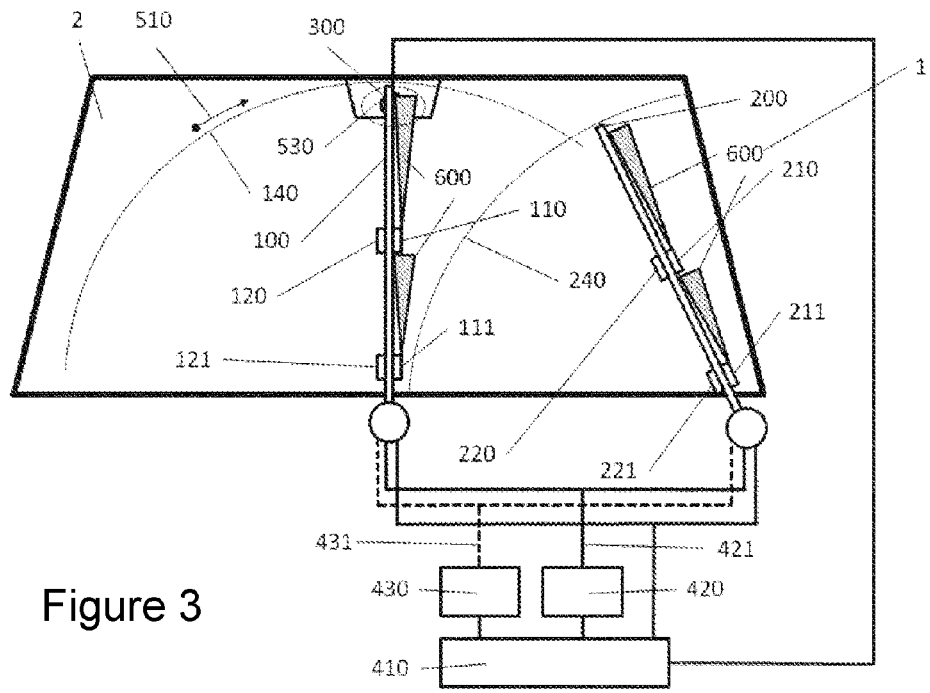
FIG. 3 shows an embodiment of the invention in a third position during wiper operation.

FIG. 3 shows the wiper system 1 from FIG. 1 still during the upward wiping movement. Wiper fluid application 600 is taking place through the wiper fluid nozzles 110, 111, 210, 211. The free end of the first wiper arm 100 is just passing the position 530 on the vehicle window 2 at which detection by the sensor unit 300 takes place. A first signal is sent to the control unit 410 by the sensor unit 300.

Figure 4:
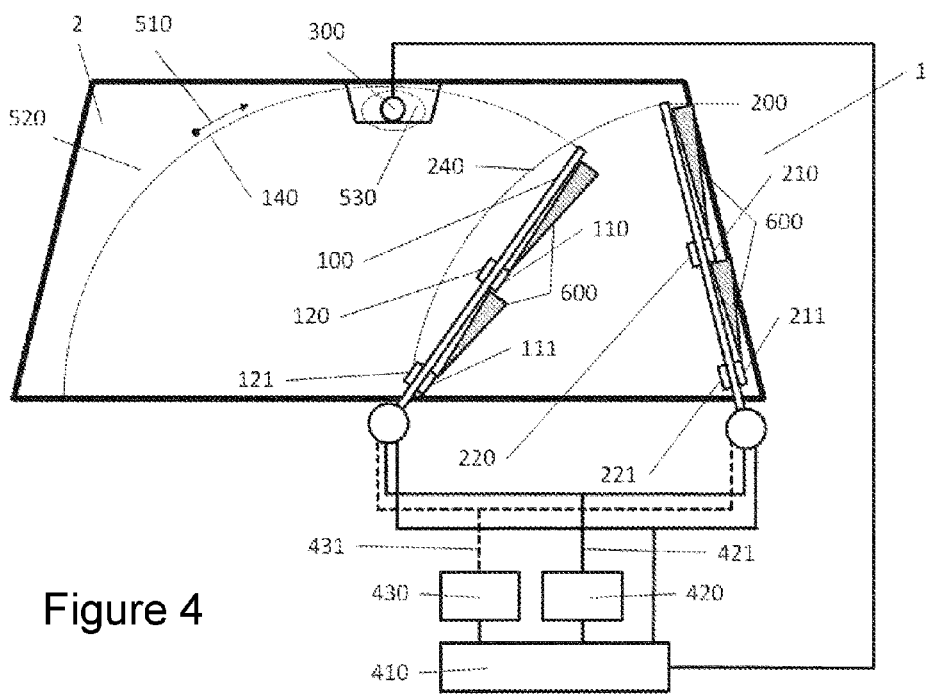
FIG. 4 shows an embodiment of the invention in a fourth position during wiper operation.

FIG. 4 shows the wiper system 1 at a reversal point, at a time tu during a method step at which the upward wiping movement 510 is changed into a downward wiping movement 520 at a reversal point at a time tu.

Figures 5, 6:
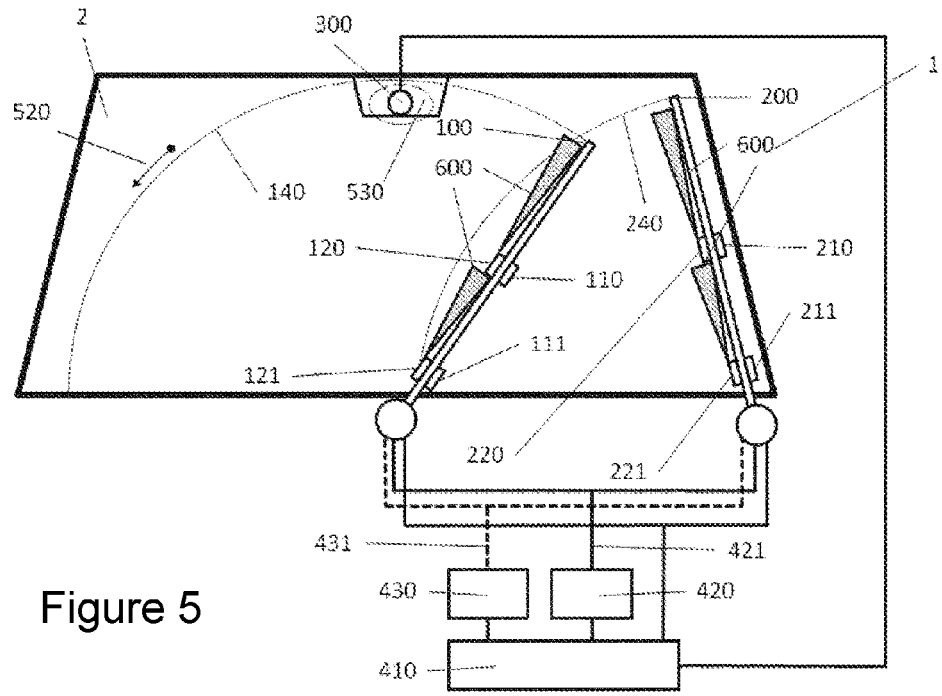
FIG. 5 shows an embodiment of the invention in a fifth position during wiper operation.
FIG. 6 shows an embodiment of the invention in a sixth position during wiper operation.

FIG. 5 shows the wiper system at the beginning of the downward wiping movement at the reversal point. The control apparatus 410 of the wiper system 1 has changed the direction of movement 520 and the fluid application 600 from the wiper nozzles 110, 111, 210, 211 to the wiper nozzles 120, 121, 220, 221.

FIG. 6 shows the wiper system 1 from FIG. 1 during the downward wiping movement 520. Wiper fluid application 600 is taking place through the wiper fluid nozzles 120, 121, 220, 221. At this time, the first wiper arm has already passed the position 530 and the sensor unit 300 a second time. At the time t2 of second passing, a second signal was preferably transmitted to the sensor unit.

Figure 7:
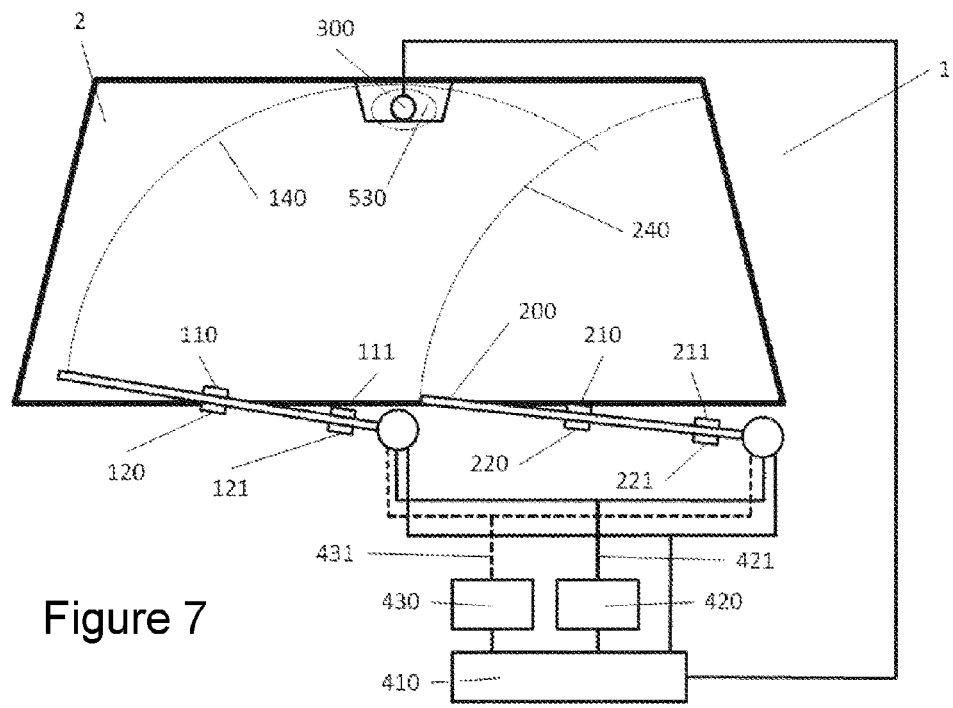
FIG. 7 shows an embodiment of the invention in a seventh position during wiper operation.

FIG. 7 shows the wiper system 1 at a return tm t3, at which the wiper arms 100, 200 have arrived in an end position. In a preferred embodiment, the end position corresponds to the starting position in FIG. 1.

Figure 8:
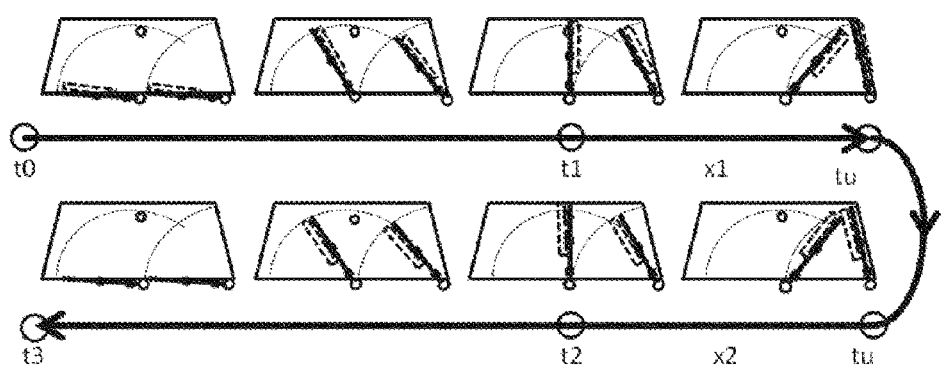
FIG. 8 shows an embodiment of the invention in different positions shown in conjunction with a timeline.

FIG. 8 shows the wiper system 1 in conjunction with a timeline which illustrates the temporal sequence of the method steps during a wiping cycle. In the top row, the sequence of steps of the wiping cycle during the upward wiping movement is illustrated. Details of the individual operating states are described with reference to FIGS. 1 to 4. At the time tu, the change to the downward wiping movement takes place. In the bottom row, the sequence of steps of the wiping cycle during the downward wiping movement is illustrated. Details of the individual operating states are described with reference to FIGS. 5 to 7. At each of the times t1 and t2, detection of the wiper arm 100, 200 takes place.

The lengths on the timeline are in this case not in a proportional ratio with the temporal intervals between the method steps, and in particular, different lengths on the timeline can represent identical temporal intervals. Furthermore, the operating states should be understood as being illustrated merely by way of example.

In the preferred embodiment, the time x1 is zero. Thus, in this embodiment, the reversal point corresponds to the position 530 of the sensor unit 300 and the time t1 is equal to the time t2 and equal to the time t2. In this embodiment, the operating states according to FIG. 4 and FIG. 5 are omitted. The change from the upward movement to the downward movement already takes place at the time t1, t2, tu in the operating state according to FIG. 3.

In one embodiment of the invention, after the first and/or second detection signal has been transmitted, the times t1 and/or t2 are determined in the control unit 300.

In a preferred embodiment, during the wiping cycle, a first period t1+x1, which is less than or equal to the time of the movement of the wiper arm 100, 200 in the first direction of movement 510 between the starting time t0 and the reversal time tu, is determined, and/or a second period (t3−(t1+x2)), which is less than or equal to the time of the movement of the wiper arm 100 and 200 in the second direction of movement 520 between the reversal time tu and the return time t3, is determined.

In the above-described embodiments, at least one first wiper fluid nozzle 110, 111, 210, 211 is controlled, during the first period t1+x1, to apply fluid 600 continuously, once or several times in front of a wiper blade of the wiper arm 100, 200 during the movement of the wiper arm in the first direction of movement 510. Optionally, at least one second wiper fluid nozzle 120, 121, 220, 221 is controlled, during the second period (t3−(t1+x2)), to apply fluid 600 continuously, once or several times in front of a wiper blade of the wiper arm 100, 200 during the movement of the wiper arm 100, 200 in the second direction of movement 520.

In one embodiment of the invention, wiper fluid application 600 is controlled by the direction of rotation of the wiper fluid pump. Depending on the direction of rotation, wiper fluid application 600 takes place through corresponding wiper fluid nozzles on the upward wiping side or downward wiping side of the wiper arms 100, 200.

In one embodiment, the wiper fluid nozzles are controlled individually for each wiper fluid nozzle and by being switched on and off directly by the control apparatus 410. To this end, at the time tu, at least one signal is sent to the pump unit 420 and/or the motor unit 4 and/or sent directly to the wiper fluid nozzles.

In one embodiment, the wiper fluid nozzles are controlled individually or together without any action on the part of the control device 410. The change takes place in this case preferably by way of a mechanical component in the wiper fluid nozzles and/or the pump unit 420.

In one embodiment, the wiping movement direction changes at the reversal point at the time tu without any action on the part of the control apparatus 410. The change takes place preferably by way of a special mechanical configuration of the mechanical attachment 431 of the wiper arms 100, 200 to the motor unit.

In one embodiment, the change in the direction of movement for the wiper arms is triggered in each case individually or together for the wiper arms by a signal being transmitted from the control device 410 to the motor unit 430.

The term fluid or wiper fluid in the present document includes further liquids for cleaning vehicle windows. In particular water in the cleaning and antifreeze additives is included in the term fluid or wiper fluid.

Although the invention has been described in detail and illustrated by means of the figures and the associated description, this illustration and this detailed description should be understood as being by way of illustration and example and not as limiting the invention. It goes without saying that those skilled in the art can make changes and modifications without departing from the scope of the following claims. In particular, the invention likewise encompasses embodiments with any combination of features which are mentioned or shown above or below to form different embodiments.

The invention likewise encompasses individual features in the figures even when they are shown therein in conjunction with other features and/or are not mentioned above or below. It is also possible for the alternatives, described in the figures and the description, of embodiments and individual alternatives of the features of which to be excluded from the subject matter of the invention or from the disclosed subject matter. The disclosure encompasses embodiments which encompass only the features described in the claims or in the exemplary embodiments and also those which encompass additional other features.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wiper system configured to apply wiper fluid to a vehicle window, the wiper system comprising:
   at least one wiper arm;
   at least one sensor system;
   at least one control apparatus; and
   at least one wiper fluid nozzle,
   wherein the sensor system is configured to:
      detect, during a wiping operation, the wiper arm in at least one defined position in a wiping area of the wiper arm, and
      send a detection signal to the control apparatus, and
   wherein the control apparatus is configured such that:
      at a start of a wiping cycle, starting from a bottom starting position, at which none of the at least one wiper fluid nozzles are active, the at least one wiper arm begins with an upward wiping movement, wherein at least one of the at least one wiper fluid nozzles that provides a fluid application in front of a wiper blade of the at least one wiper arm in the upward wiping movement is supplied with wiper fluid, and
      when or after a free end of the at least one wiper arm passes or has passed the defined position detected by the sensor system and a reversal point from the upward wiping movement into a downward wiping movement is reached, at least one of the at least one wiper fluid nozzles that provides a fluid application in front of the wiper blade of the at least one wiper arm in the downward wiping movement is supplied with wiper fluid until the at least one wiper arm has arrived in an end position corresponding to the bottom starting position.

2. The wiper system as claimed in claim 1, wherein the sensor system is configured to be arranged at an upper edge in a middle of the vehicle window.

3. The wiper system as claimed in claim 2, wherein the sensor system is further configured as one or more of a rain sensor, a light sensor and a camera.

4. The wiper system as claimed in claim 1, wherein the sensor system is further configured as one or more of a rain sensor, a light sensor and a camera.

5. A method for applying wiper fluid to a vehicle window using wiper fluid nozzles, the method comprising the acts of:
   carrying out a movement of a wiper arm;
   detecting the wiper arm in a defined position by a sensor system in a wiping area of the wiper arm when the wiping arm is in a wiping operation; and
   sending, by the sensor system, a detection signal to a control apparatus, wherein the control apparatus is configured such that:
      at a start of a wiping cycle, starting from a bottom starting position, at which none of the wiper fluid nozzles are active, the wiper arm begins with an upward wiping movement, wherein at least one of the wiper fluid nozzles that provides a fluid application in front of a wiper blade of the wiper arm in the upward wiping movement is supplied with wiper fluid, and
      when or after a free end of the wiper arm passes or has passed the defined position detected by the sensor system and a reversal point from the upward wiping movement into a downward wiping movement is reached, at least one of the wiper fluid nozzles that provides a fluid application in front of the wiper blade of the wiper arm in the downward wiping movement is supplied with wiper fluid until the wiper arm has arrived in an end position corresponding to the bottom starting position.

* * * * *